United States Patent
Agrawal et al.

(10) Patent No.: US 6,399,012 B1
(45) Date of Patent: Jun. 4, 2002

(54) PRODUCTION OF PASSIVE DEVICES

(76) Inventors: Dinesh Agrawal, c/o The Pennsylvania State University, University Park, PA (US) 16802; Ramesh Raghavendra, c/o Harris Ireland Development Limited, Dundalk (IE); Balasubramaniam Vaidhyanathan, c/o Institute of Polymer Technology & Materials Engineering (IPTME), Leicestershire (GB)

( * ) Notice: Subject to any disclaimer, the term of this patent is extended or adjusted under 35 U.S.C. 154(b) by 0 days.

(21) Appl. No.: 09/709,521

(22) Filed: Nov. 13, 2000

(30) Foreign Application Priority Data

Nov. 10, 1999 (EP) .............................................. 99650104
Nov. 10, 1999 (EP) .............................................. 99650105

(51) Int. Cl.[7] .............................................. H05B 6/64
(52) U.S. Cl. ........................... 264/432; 427/79; 427/80; 427/101; 427/559
(58) Field of Search ......................... 264/432; 427/559, 427/79, 80, 101

(56) References Cited

U.S. PATENT DOCUMENTS

| | | | |
|---|---|---|---|
| 4,538,347 A | 9/1985 | Palilla et al. .................. | 29/619 |
| 5,223,186 A | 6/1993 | Eastman et al. ............... | 264/25 |
| 5,431,966 A | 7/1995 | Daude et al. ................. | 427/553 |
| 5,481,428 A | * 1/1996 | Lauf et al. .................... | 361/305 |
| 5,653,775 A | 8/1997 | Plovnick et al. .............. | 51/301 |
| 5,720,859 A | 2/1998 | Czubarow et al. ........... | 204/157 |
| 5,858,037 A | 1/1999 | Sukumaran Jayan ......... | 51/309 |
| 5,874,377 A | 2/1999 | Apteet et al. ................. | 501/97 |
| 5,963,823 A | 10/1999 | Yamazaki et al. ........... | 438/487 |

FOREIGN PATENT DOCUMENTS

| | | |
|---|---|---|
| JP | 5-6808 | 1/1993 |
| WO | WO97/47018 | 12/1997 |

OTHER PUBLICATIONS

Patent Abstracts of Japan, vol. 17, No. 261 & JP 05 006808 A (Toyota Central Res & Dev Lab Inc.), Jan. 14, 1993.

* cited by examiner

Primary Examiner—Christopher A. Fiorilla
(74) Attorney, Agent, or Firm—Jacobson Holman, PLLC

(57) ABSTRACT

Varistors are produced by pressing ceramic ZnO powder to provide discs, sintering the discs with microwave radiation, and firing outer electrodes with microwave radiation. The sintering has a maximum plateau temperature of 1000° C. to 1300° C. and the duration for ramping to this temperature and maintenance at this temperature is 120 to 180 minutes. These parameters also apply for multi-layer varistors with inner electrodes. The outer electrodes are fired at a maximum plateau temperature of 550° C. to 820° C. for a total duration of 40 to 45 minutes.

13 Claims, 4 Drawing Sheets

PRODUCTION OF PASSIVE DEVICES

FIELD OF THE INVENTION

The invention relates to production of passive devices such as electro-cerarmic varistor and capacitor devices.

PRIOR ART DISCUSSION

Varistors are produced by pressing metal oxide ceramic powder such as Zinc Oxide powder. The pressed powder is sintered to provide the body (often referred to as a "disc") of the varistor, which exhibits the non-linear current-voltage characteristics. Conductive electrodes are applied to the disc and they are cured (or "fired"). Also, a method of producing capacitors involves pressing ceramic powder and sintering the disc, followed by firing electrodes.

For passive devices such as these, it is well recognised that the sintering part of the process is very important for setting the microstructure (grain size and grain boundary chemistry) and the composition. These in turn determine electrical properties such a nominal voltage (Vnom), energy handling capability, clamping performance (varistor), and capacitance (capacitors).

Sintering has typically been performed by conveying the discs through a continuous oven at a temperature typically in the range of 1200° C. to 1300° C. For varistors, the sintering time is of the order of 18 to 30 hours and this process has effectively imposed limits on Vnom and the clamp ratio. There is also, of course, a high energy consumption.

Use of microwave radiation for sintering has been described in Japanese Patent Specification No. JP 05006808. This document describes a process of sintering compounded and moulded zinc oxide powder by irradiation with microwave radiation for a very short duration.

Regarding outer electrodes, these are formed on the discs by thick film deposition of the electrode material, typically thick film silver or a silver-palladium alloy mixed with 4–6% glass frit and a 25–30% organic binder-solvent mix. The film is then dried and then fired (cured) using radiant heat sources. This is a slow process with limited throughput and involves considerable energy consumption. In another approach, described in U.S. Pat. No. 5,720,859 (Raychem), a combination of a metal source and a source of reducing carbon are coated onto a varistor body. The coated varistor is then irradiated with microwave radiation to effect carbothermic reduction of the metal source to metal.

The present invention is, directed towards providing an improved production process which involves less energy consumption, and a shorter time.

SUMMARY OF THE INVENTION

According to the invention, there is provided a method of producing a passive device comprising the steps of pressing a ceramic powder to provide device bodies, sintering the device bodies, depositing outer electrodes onto the device bodies, and firing the outer electrodes, characterised in that, the device bodies are sintered by irradiation with microwave radiation in which:

the temperature of the device bodies is increased in a ramping stage to a maximum temperature in the range of 1000° C. to 1300° C. and is then maintained at substantially the maximum temperature; and the time duration for both the ramping stage and maintenance of the temperature at substantially the maximum temperature is in the range of 120 minutes to 180 minutes.

In one embodiment, at least one thousand device bodies are mounted within a container comprising insulating outer walls and internal heat distribution rods, and the container is irradiated with said microwave radiation.

In one embodiment, the outer walls are of a fibrous ceramic material.

In another embodiment, the heat distribution rods are of silicon carbide material.

In one embodiment, the heat distribution rods are of molysilicide material.

In one embodiment, the temperature ramping gradient is in the range of 10° C. to 20° C. per minute.

In one embodiment, the gradient is in the range of 15° C. to 16° C. per minute.

In one embodiment, the device body comprises a multilayer structure of ceramic layers separated by inner electrodes.

In a further embodiment, the inner electrodes are of platinum material.

In one embodiment, the inner electrodes are applied by wet stacking.

In one embodiment, the outer electrodes are fired by irradiation with microwave radiation.

In one embodiment, the radiation is applied to heat the outer electrodes to a temperature in the range of 550° C. to 820° C. in a time for temperature ramping and maintenance of 30 minutes to 45 minutes.

In one embodiment, the ramping gradient is in the range of 20° C. to 25° C. per minute.

In one embodiment, the outer electrode material is silver-based.

According to another aspect, the invention provides a method for applying an outer electrode to the body of a passive device, the process comprising the steps of:

applying electrode material to the body as a film; and firing the electrode material by subjecting it to microwave radiation.

In one embodiment, the firing temperature is within the range of 550° C. to 820° C. and the firing time period is, 10 to 20 minutes.

In one embodiment, the firing time is approximately 15 minutes.

In one embodiment, the total time duration for temperature ramping and maintenance at the firing temperature is in the range of 30 to 45 minutes.

In one embodiment, the outer electrode material is silver-based.

DETAILED DESCRIPTION OF THE INVENTION

Brief Description of the Drawings

The invention will be more clearly understood from the following description of some embodiments thereof given by way of example only with reference to the accompanying drawing, in which.

DESCRIPTION OF THE EMBODIMENTS

Zinc oxide varistors are produced in a method which involves pressing zinc oxide powder to form varistor bodies, referred to as "discs" because of their shape. The applied pressure is 4800 N and the disc density is 3.0 g/cm$^3$.

Figure 1:
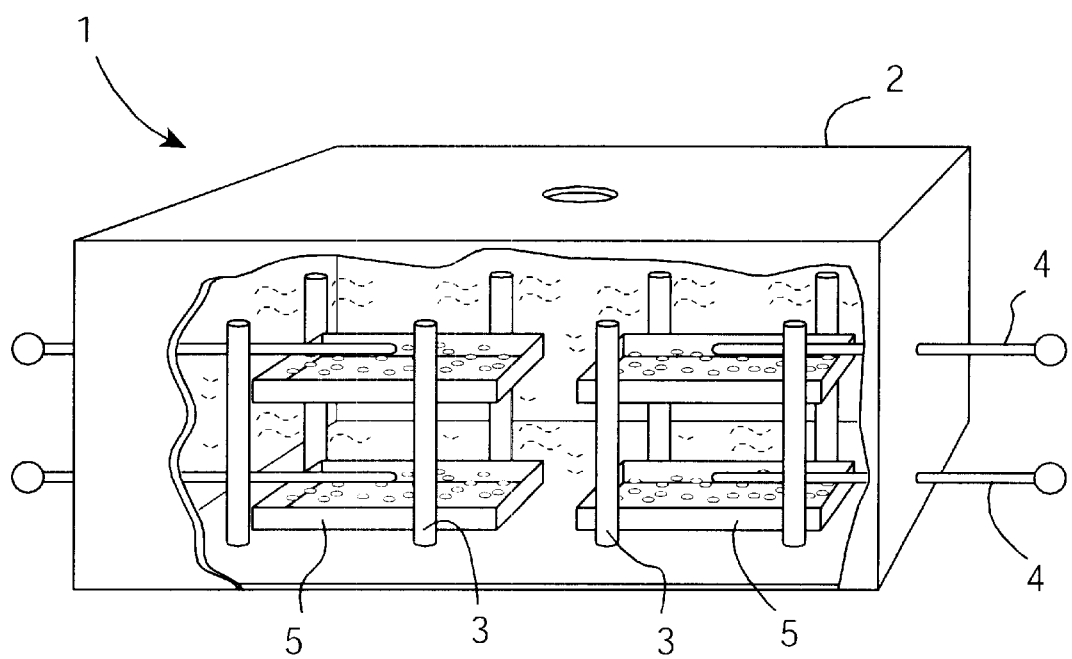
FIG. 1 is a perspective view of a container used in sintering of varistor discs in a method of the invention.

The discs are then mounted in a container 1, illustrated in FIG. 1. The container 1 is of rectangular box construction with dimensions of 65 cm length, 35 cm width, and 25 cm height. Outer walls 2 are of fibrous ceramic insulation material capable of withstanding temperatures of up to 1600° C. The container 1 also comprises heat distribution rods 3 of silicon carbide material, although they may alternatively be of molysilicide material. The rods 3 are used for distribution of heat within the outer walls to achieve temperature uniformity and to help control temperature ramping. The container also comprises Pt/Ro thermocouples 4 for temperature monitoring. In addition, optical pyrometry is used for temperature sensing. The discs are placed in trays or "saggers" 5, four of which are mounted in the container 1 in a configuration of two pairs each having one above the other. Each tray can hold 2000 to 5000 discs distributed randomly.

Figure 2:
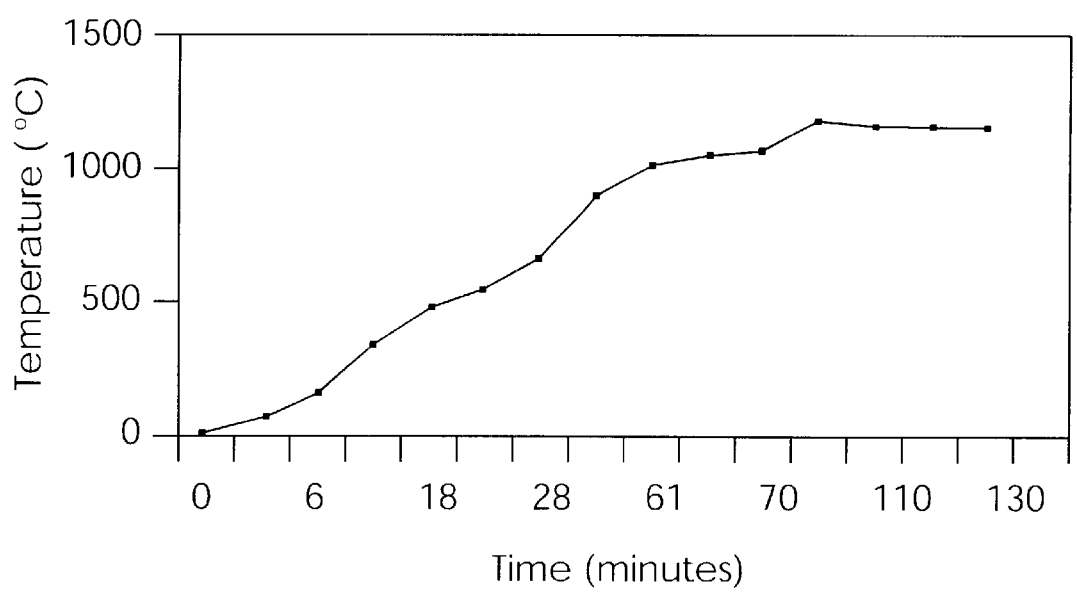
FIG. 2 is a time-temperature plot for sintering of the discs.

The container is then subjected to microwave radiation at a frequency of 2.45 GHz and a maximum power output of 6 kW but only 20% to 30% power was used. The microwave source is controlled in response to the temperature sensing to ramp the disc temperature at a gradient in the range of 10° C. to 20° C. per minute and preferably 15° C. to 16° C. per minute. Ramping is continued until the temperature reaches a plateau in the range of 1000° C. to 1300° C. and preferably approximately 1200° C. This is illustrated in FIG. 2, from which it will be seen that the ramping duration is approximately 70 minutes and the gradient is approximately 15.5° C./min, the plateau temperature is approximately 1200° C. and the total duration for both ramping and maintenance of the plateau temperature is 130 minutes. It has been found that the duration may be in the range of 120 to 180 minutes.

It is noted that by microwave sintering in this manner the sintering duration is only approximately one tenth of the time for conventional sintering. The binder burn-out stage for conventional sintering is avoided.

The sintered discs have a density exceeding 98% of their theoretical value. Also, a micro-structural analysis reveals that the discs have a smaller grain structure (4 to 5 microns) than achieved with conventional sintering. The electrical properties match those of conventionally-sintered discs, and the clamp ratio is better than for conventional sintering.

Figure 3:
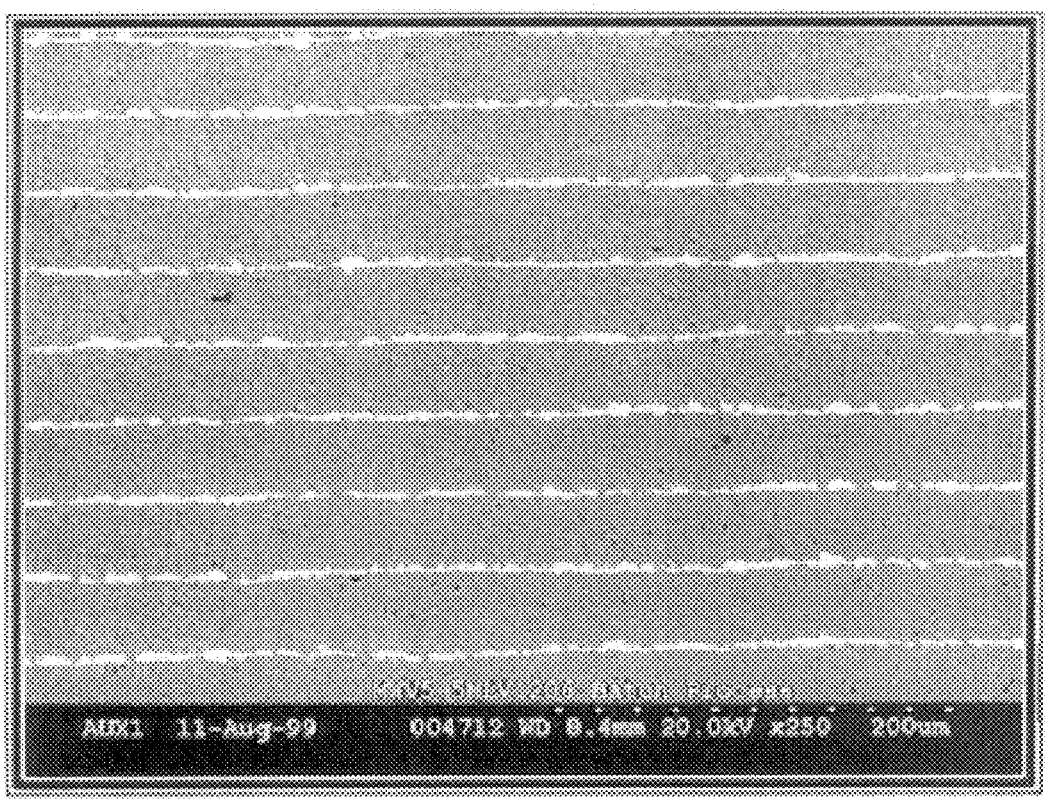
FIG. 3 is a photograph of a sintered and fired multi-layer varistor.

In another embodiment, multi-layer varistors with platinum inner electrodes and ZnO ceramic layers are produced. The ceramic layers and the electrode layers are formed by wet stacking and the electrodes have a thickness of 3 to 10 microns. The bodies formed in this mariner are simultaneously sintered and fired in the container 1 using the same microwave irradiation parameters as set out above. The ZnO is sintered while the platinum is simultaneously fired. The resulting structure is shown in FIG. 3, from which it will be apparent that the platinum inner electrodes are intact and continuous.

As for the single-layer varistor production described above, for multi-layer varistors there is no need for a binder bum out stage in the process of the invention and the production time is considerably less than heretofore. Also, the electrical performance of the sintered varistors is again much better than that of varistors produced with conventional sintering. An example is provided in Table 1 below for a Littelfuse V5.5 mla 1206 type of multi-layer varistor (MLV).

TABLE 1

| Vnom | Variance (Vnom) | Clamp ratio | IR |
|---|---|---|---|
| Sintered according to invention | | | |
| 19.22 | 2.45 | 1.539 | 0.892 |
| Conventional sintering | | | |
| 8.23 | 2.98 | 1.927 | 0.920 |

From Table 1 it can be seen that the process of the invention yields higher Volts/mm varistors and gives a better clamp performance. Leakage characteristics (IR) and other electrical properties relevant to varistors (peak pulse, energy, life test) have been measured and the data exhibits a similar trend.

Figure 4:
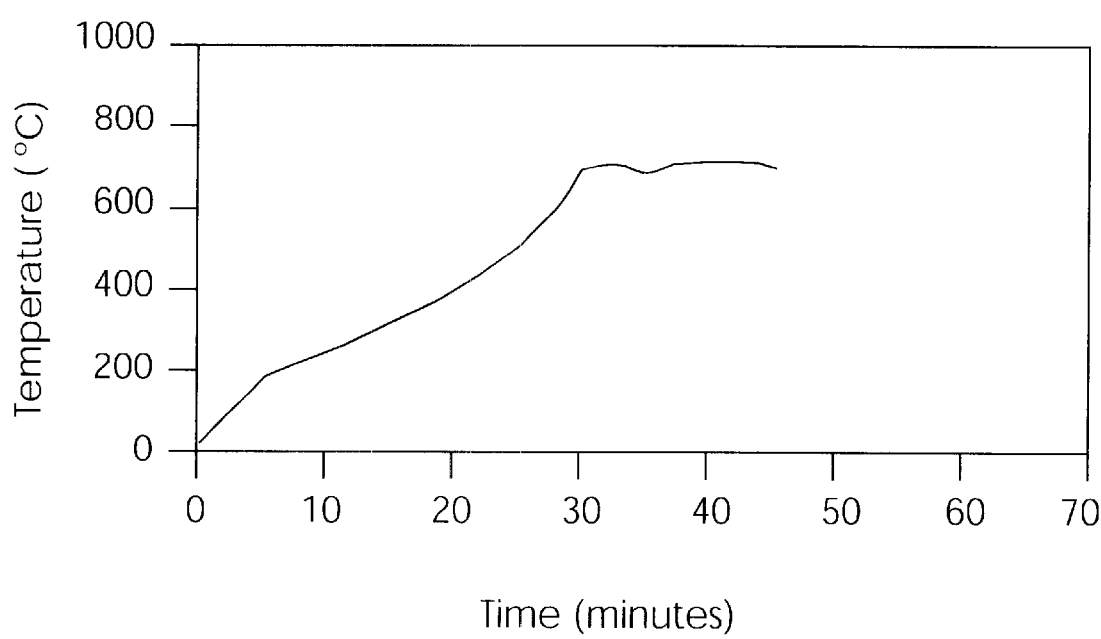
FIG. 4 is a time-temperature plot for firing of outer electrodes.

Referring again to single-layer varistor production, after sintering, outer electrode material is deposited on the discs by screen-printing. The electrode material is silver-based. This material is fired in the container 1 using 2.45 GHz microwave radiation to provide radial electrodes. The radiation is applied so that the electrodes are fired at a temperature within the range of 650° C. to 820° C. and in this embodiment approximately 700° C. for 13 to 17 minutes with a total duration for both ramping and plateau in the range of 40–45 minutes. The ramping gradient is approximately 23° C. per minute and more generally may be in the range of approximately 20° C. per minute to 25° C. per minute. A plot is shown in FIG. 4. The actual temperature depends on the electrode material, in which the glass frit is an important parameter. In contrast, a conventional firing time duration for these varistors is usually 8 hours with peak temperatures in the range 800–850° C. depending on the glass frit in the silver paste.

It has been found that firing in this manner achieves similar electrical characteristics to that of conventional firing in spite of the lower temperature and significantly reduced cycle time. It has also been found that the grain microstructure is in the range of 8 to 12 microns, as compared to 15 to 20 microns for conventional firing.

Silver palladium end-terminated multilayer varistors (MLV's) were also fired using microwave radiation at temperatures in the range 550–600° C. with a total cycle time of approximately 35 minutes. Multi-layer varistors with silver-platinum electrodes were also successfully fired using similar parameters.

It has been found that microwave firing results in better leakage characteristics than that of conventional firing. Other electrical parameters such as peak pulse and energy were found to be similar. Solderability of the electrodes is as good as for conventionally-produced electrodes, with grater than 95% wettability.

The invention is not limited to the embodiments described, but may be varied in construction and detail. For example, the sintering and firing steps may be carried out for other passive devices such as capacitors. A ceramic capacitor formulation was also successfully sintered using microwave radiation using the parameters set out above. The capacitor formulation comprises oxides of bismuth, magnesium and niobium and possessing a pyrochlore unit structure of type $A_2B_2O_7$. Multilayer capacitors of the said formulation had silver-palladium inner electrodes and these were found intact when fired under microwave radiation.

What is claimed is:

1. A method of producing passive devices comprising the steps of pressing ceramic powder to provide device bodies, sintering the device bodies, depositing outer electrodes onto the device bodies, and firing the outer electrodes, the device bodies are sintered by irradiation with microwave radiation in which the temperature of the device bodies is increased in a ramping stage to a maximum temperature in the range of 1000° C. to 1300° C. and is then maintained at substantially the maximum temperature; and the time duration for both the ramping stage and maintenance of the temperature at substantially the maximum temperature is in the range of 120 minutes to 180 minutes;

at least one thousand device bodies are mounted within the container including insulating outer walls and internal heat distribution rods, and the container is irradiated with said microwave radiation.

2. The method as claimed in claim 1, wherein the outer walls are of a fibrous ceramic material.

3. The method as claimed in claim 1, wherein the heat distribution rods are of silicon carbine material.

4. The method as claimed in claim 1, wherein the internal heat distribution rods are of molysilicide material.

5. The method as claimed in claim 1, wherein the temperature ramping gradient is in the range of 10° C. to 20° C. per minute.

6. The method as claimed in claim 5, wherein the gradient is in the range of 15° C. to 16° C. per minute.

7. The method as claimed in claim 1, wherein each of said device bodies comprises a multi-layer structure of ceramic layers separated by inner electrodes.

8. The method as claimed in claim 7, wherein the inner electrodes are of platinum material.

9. The method as claimed in claim 7, wherein the inner electrodes are applied by wet stacking.

10. The method as claimed in claim 1, wherein the outer electrodes are fired by irradiation with microwave radiation.

11. The method as claimed in claim 10, wherein the radiation is applied to heat the outer electrodes to a temperature in the range of 550° C. to 820° C. in a time for temperature ramping and maintenance of 30 minutes to 45 minutes.

12. The method as claimed in claim 11, wherein the ramping gradient for firing the outer electrodes is in the range of 20° C. to 20° C. per minute.

13. The method as claimed in claim 10, wherein the outer electrode material is silver-based.

* * * * *